United States Patent
Nagase

(10) Patent No.: US 11,348,344 B2
(45) Date of Patent: May 31, 2022

(54) LINE DETECTION DEVICE, LINE DETECTION METHOD, PROGRAM, AND STORAGE MEDIUM

(71) Applicant: PIONEER CORPORATION, Tokyo (JP)

(72) Inventor: Taro Nagase, Saitama (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 16/979,498

(22) PCT Filed: Mar. 9, 2018

(86) PCT No.: PCT/JP2018/009162
§ 371 (c)(1),
(2) Date: Sep. 9, 2020

(87) PCT Pub. No.: WO2019/171565
PCT Pub. Date: Sep. 12, 2019

(65) Prior Publication Data
US 2021/0042537 A1     Feb. 11, 2021

(51) Int. Cl.
G06V 20/56     (2022.01)
G06V 10/56     (2022.01)

(52) U.S. Cl.
CPC ............ G06V 20/588 (2022.01); G06V 10/56 (2022.01)

(58) Field of Classification Search
CPC ............ G06K 9/00798; G06K 9/4652; G06K 9/3233; G06T 2207/30256; G06T 7/12; G06T 7/60; G08G 1/16; B60R 21/00
See application file for complete search history.

(56) References Cited

U.S. PATENT DOCUMENTS

| 7,965,870 B2 | 6/2011 | Kobayashi et al. |
| 9,436,878 B2 | 9/2016 | Sakamoto |

(Continued)

FOREIGN PATENT DOCUMENTS

| JP | 2006209209 A | 8/2006 |
| JP | 2007018154 A | 1/2007 |
| JP | 2014164492 A | 9/2014 |

OTHER PUBLICATIONS

Tanaka et al., A Rebust White Line Decetion Method for Road Surfece Maintenance,IEICE Transactions on Information and Systems (Japanese Edition) vol. J91-D, No. 8, dated Aug. 1, 2008; pp. 2129-2136. English abstract and partial translation provided; cited in PCT/JP2018/009162 ISR.

(Continued)

*Primary Examiner* — Carol Wang
(74) *Attorney, Agent, or Firm* — Procopio, Cory, Hargreaves & Savitch LLP

(57) ABSTRACT

A line detection device (10) includes a first detection unit (100) and a second detection unit (200). The first detection unit (100) extracts a pixel located in a range having a predetermined color from an image including a traveling path on which a mobile object travels, and specifies a line of a first color included in the image using a distribution of the extracted pixel in the image. After execution by processing by the first detection unit (100), the second detection unit (200) extracts a pixel located in a luminance range having a predetermined luminance from the image and specifies a line of a second color which is included in the image and is different from the first color using a distribution of the extracted pixel in the image.

8 Claims, 18 Drawing Sheets

(56) References Cited

U.S. PATENT DOCUMENTS

| | | | |
|---|---|---|---|
| 2009/0080704 A1* | 3/2009 | Mori | G06K 9/00798 |
| | | | 382/104 |
| 2009/0123065 A1 | 5/2009 | Kobayashi et al. | |
| 2009/0245582 A1* | 10/2009 | Sakamoto | H04N 7/18 |
| | | | 382/104 |
| 2010/0098297 A1* | 4/2010 | Zhang | G08G 1/166 |
| | | | 382/104 |
| 2011/0019000 A1* | 1/2011 | Sakamoto | G06K 9/00798 |
| | | | 348/148 |
| 2012/0194677 A1* | 8/2012 | Suzuki | G06K 9/00798 |
| | | | 348/148 |
| 2015/0278612 A1 | 10/2015 | Sakamoto | |
| 2018/0181819 A1* | 6/2018 | Kawano | B60R 1/00 |

OTHER PUBLICATIONS

International Search Report for related JP App. No. PCT/JP2018/009162 dated May 15, 2018; 2 pages.

Extended European Search Report dated Sep. 24, 2021 in counterpart European Patent Application No. 18908694.5. 8 pages.

* cited by examiner

S80

50

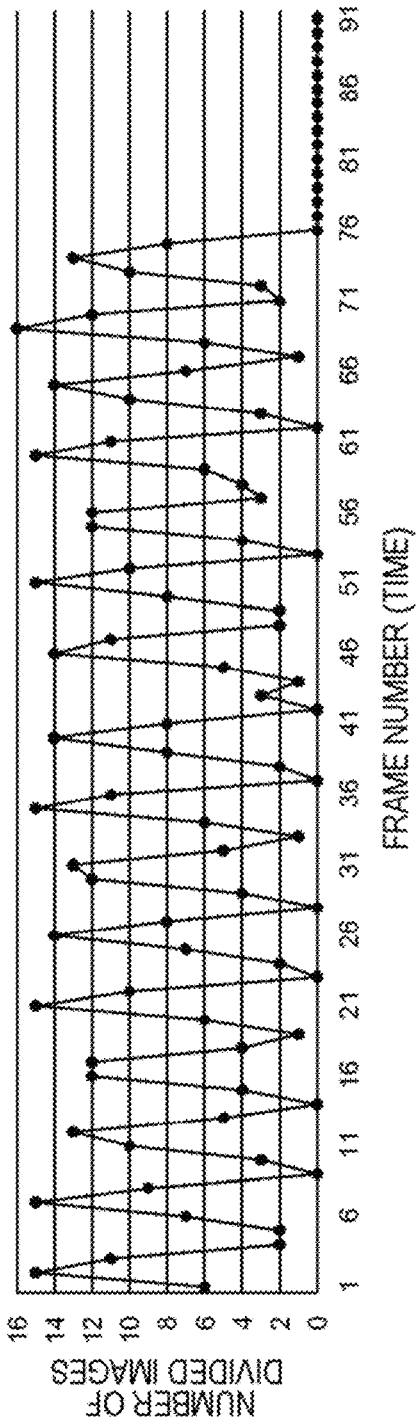
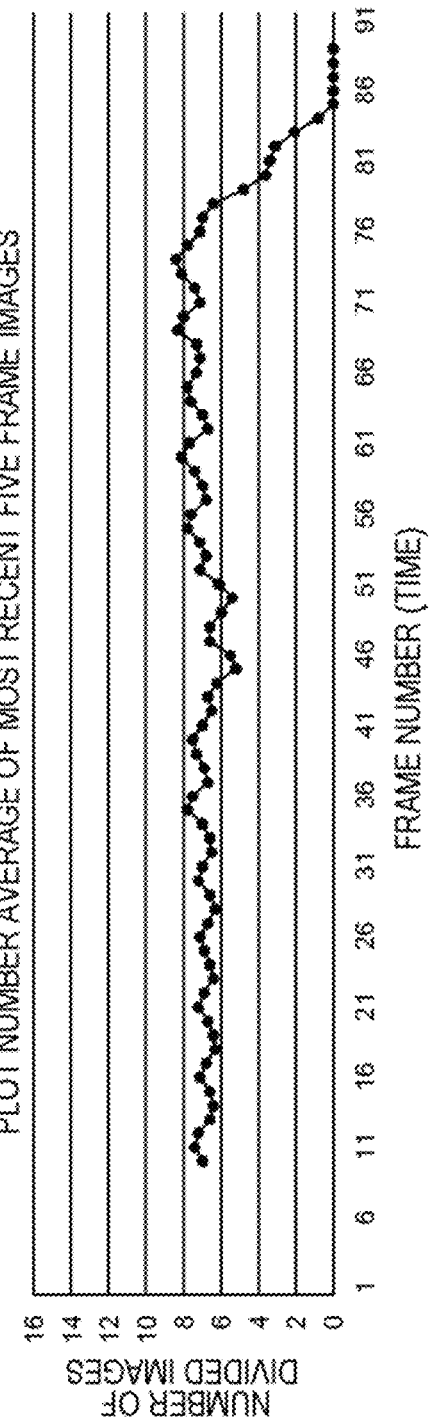

LINE DETECTION DEVICE, LINE DETECTION METHOD, PROGRAM, AND STORAGE MEDIUM

CROSS-REFERENCE TO RELATED APPLICATIONS

This application is a U.S. National Stage entry of PCT Application No. PCT/JP2018/009162, filed on Mar. 9, 2018. The contents of the foregoing are incorporated by reference.

TECHNICAL FIELD

The present relates to a line detection device which detects a line drawn on a traveling path, a line detection method, a program, and a storage medium.

BACKGROUND ART

In recent years, there have been developments in technology for automatically moving a mobile object such as a vehicle. In such technology, it is important to accurately detect a line drawn on a traveling path. It is necessary to be able to detect the color of this line since the meaning of the line differs depending on the color. For example, Patent Document 1 detects a line of a specific color by extracting an edge of change in color in an image.

RELATED ART DOCUMENT

Patent Document

[Patent Literature 1]: Japanese Unexamined Patent Application Publication No. 2014-164492

SUMMARY OF THE INVENTION

Differently colored lines are used on traveling paths, and each colored line has its meaning. Therefore, it is preferable to accurately detect a line of a specific color.

An example of the problem to be solved by the present invention is to accurately detect a line of a specific color from an image including a traveling path.

Means for Solving the Problem

The invention described in claim 1 is a line detection device including:

a first processing unit that extracts a pixel located in a range including a predetermined color from an image including a traveling path on which a mobile object travels to detect a line of a first color included in the image using a distribution of the extracted pixel in the image, and a second processing unit that extracts, after execution of processing by the first processing unit, a pixel located in a luminance range including a predetermined luminance from the image and specifies a line of a second color which is included in the image and is different from the first color using a distribution of the extracted pixel in the image.

The invention described in claim 7 is a line detection method executed by a computer, the method including:

processing an image including a traveling path on which a mobile object travels to detect a line of a first color comprised in the image; and extracting, after execution of detection processing of the line of the first color, a pixel located in a luminance range including a predetermined luminance from the image and specifying a line of a second color which is included in the image and is different from the first color using a distribution of the extracted pixel in the image.

The invention described in claim 8 is a program causing a computer to execute processing including:

processing an image including a traveling path on which a mobile object travels to detect a line of a first color included in the image; and extracting, after detection processing of the line of the first color, a pixel located in a luminance range including a predetermined luminance from the image, and specifying a line of a second color which is included in the image and is different from the first color using a distribution of the extracted pixel in the image.

The invention described in claim 9 is a storage medium storing a program executable by a computer, the program causing the computer to execute processing including:

processing an image comprising a traveling path on which a mobile object travels to detect a line of a first color comprised in the image; and extracting, after execution of detection processing of the line of the first color, a pixel located in a luminance range including a predetermined luminance from the image and specifying a line of a second color which is included in the image and is different from the first color using a distribution of the extracted pixel in the image.

BRIEF DESCRIPTION OF THE DRAWINGS

The objects described above, and other objects, features and advantages are further made apparent by suitable embodiments that will be described below and the following accompanying drawings.

FIGS. 18A and 18B are diagrams to explain one example of processing performed by a determination unit.

DESCRIPTION OF EMBODIMENTS

Figure 1:
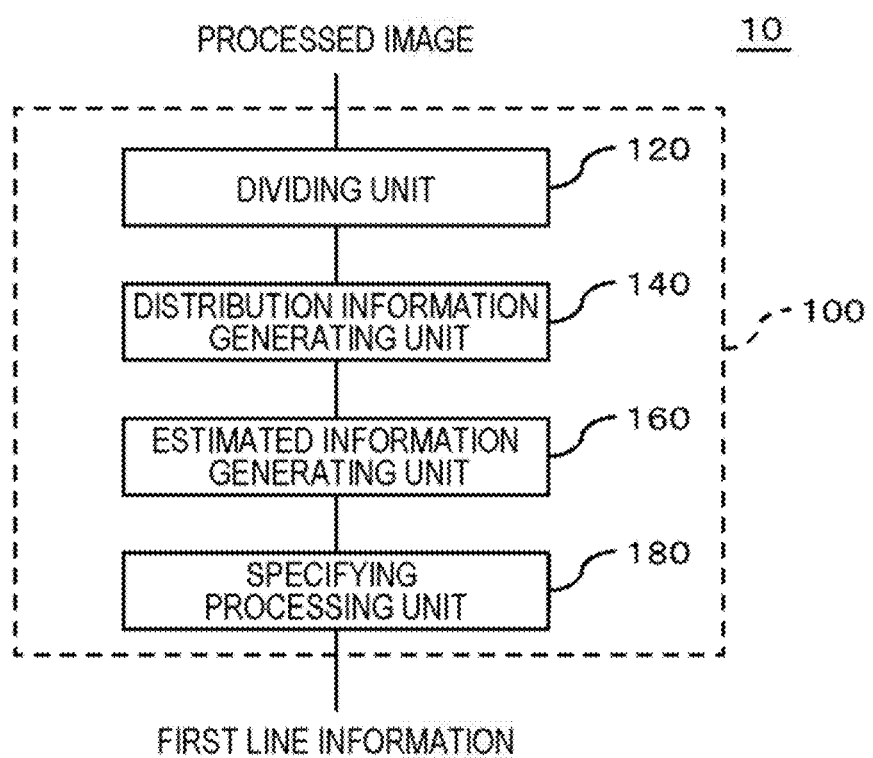
FIG. 1 is a diagram showing a functional configuration of a line detection device according to a first embodiment.

Embodiments of the present invention will be described below by referring to the drawings. Moreover, in all the drawings, the same constituent elements are given the same reference numerals, and descriptions thereof will not be repeated.

First Embodiment

Figure 2:
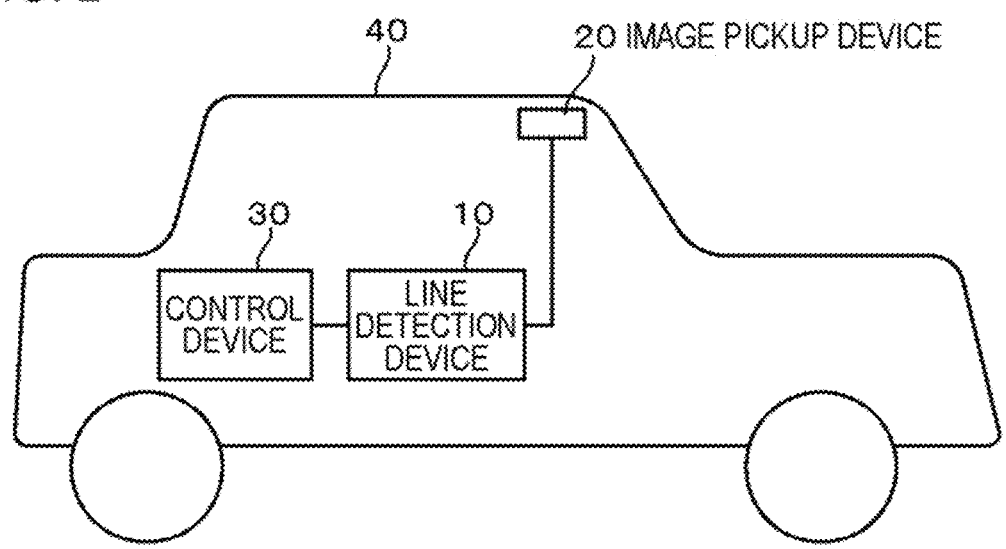
FIG. 2 is a diagram showing a mobile object mounted with a line detection device.

FIG. 1 is a diagram showing a functional configuration of a line detection device 10 according to a first embodiment. FIG. 2 is a diagram showing a mobile object 40 mounted with the line detection device 10. The line detection device 10 detects a line drawn on a traveling path on which the mobile object 40 travels and includes a dividing unit 120, an estimated information generating unit 160, and a specifying processing unit 180 (first specifying processing unit). The dividing unit 120 generates a plurality of first divided images by dividing an image including a traveling path on which a mobile object travels (hereinafter referred to as a processed image) along a first direction including a component of the extending direction of the traveling path. The estimated information generating unit 160 executes processing to select first candidate pixels with respect to each of the plurality of first divided images. The first candidate pixels are estimated as a portion of a first line drawn on the traveling path. The specifying processing unit 180 specifies the first line included in the processed image based on locations of a plurality of first candidate pixels in the processed image. Then, a first detection unit 103 outputs information showing the specified first line (first line information).

In addition, the line detection device 10 includes a distribution information generating unit 140. Therefore, the line detection device 100 can be regarded as to include the distribution information generating unit 140, the estimated information generating unit 160, and the specifying processing unit 180. The distribution information generating unit 140 generates first distribution information which shows a distribution of pixels satisfying a criterion from the processed image. The estimated information generating unit 160 selects the first candidate pixels using the first distribution information. The specifying processing unit 180 specifies the first line included in the processed image based on the locations of the first candidate pixels in the above-mentioned image.

The present embodiment will be explained in detail below.

The mobile object 40 is a vehicle, for example, an automobile, a motorcycle, or the like. In this case, one example of the traveling path is a road, and the first line and a later-described second line define a traffic lane. However, the mobile object 40 may be an airplane. In such a case, the traveling path is a runway.

As shown in FIG. 2, the mobile object 40 includes an image pickup device 20 and a control device 30. The image pickup device 20 generates a moving image including a traveling path by capturing the front of the mobile object 40. Then, a plurality of frame images constituting this moving image are outputted to the line detection device 10. The line detection device 10 detects a first line included in the traveling path for each frame image and generates first line information showing the detected first line. The first line information includes the location of the first line and the color of the first line. This processing to generate the first line information is performed with respect to each of the plurality of frame images. However, the processing to generate the first line information may be performed with respect only to a portion of the frame images constituting the moving image.

The first line information is outputted to the control device 30. The control device 30 controls traveling of the mobile object 40. In a case where the mobile object 40 is an automobile, the control device 30 is for autonomous driving. The level of autonomous driving performed by the control device 30 is, for example, equal to or greater than Level 3 but is not limited thereto. The control device 30 uses the first line information when controlling traveling of the mobile object 40. Meanwhile, the control device 30 may generate information necessary when controlling the traveling of the mobile object 40 instead of directly controlling traveling of the mobile object 40. In this case also, the control device 30 generates necessary information using the first line information. Information generated here is, for example, information to notify (for example, display) the possibility of a lane change, information to notify (for example, display) the need to temporarily stop, or the like. The information is displayed on, for example, a display device (for example, a display of a car navigation device inside the vehicle) visually observable by the operator of the mobile object 40.

As shown in FIG. 1, the line detection device 10 includes the dividing unit 120, the distribution information generating unit 140, the estimated information generating unit 160, and the specifying processing unit 180. Details of processing performed by the above will be described later using flowcharts.

Meanwhile, in the example shown in FIG. 2, the line detection device 10 is mounted in the mobile object 40. However, the line detection device 10 may be located outside the mobile object 40. In this case, the line detection device 10 is connected to the image pickup device 20 and the control device 30 via a wireless communication circuit. Further, the control device 30 may be located outside the mobile object 40 or may be detachably mounted on the mobile object 40. For example, in a case where the line detection device 10 is located at the exterior (an external server or the like) of the mobile object 40, the line detection device 10 can specify a line drawn on a traveling path on which the mobile object 40 traveled (for example, a division line) and also update map information using information to specify the specified line by acquiring a moving image from the image pickup device 20 and analyzing frame images which constitute the moving image. In this case, the map information can be easily maintained.

Figure 3:
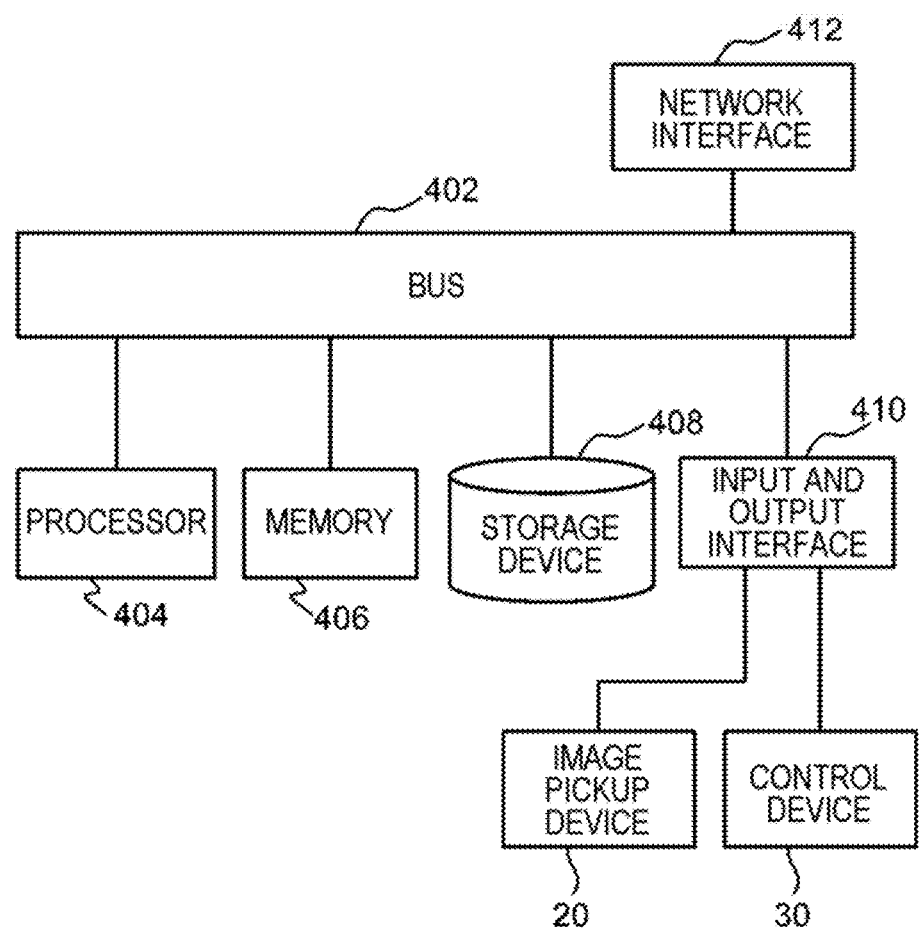
FIG. 3 is a diagram showing one example of a hardware configuration of a line detection.

FIG. 3 is a diagram showing one example of a hardware configuration of the line detection device 10. The main configuration of the line detection device 10 is implemented using an integrated circuit. This integrated circuit includes a bus 402, a processor 404, a memory 406, a storage device 408, an input and output interface 410, and a network interface 412. The bus 402 is a data transmission path through which the processor 404, the memory 406, the storage device 408, the input and output interface 910, and the network interface 412 mutually transmit and receive data. However, the method of connecting the processor 404 or the like to each other is not limited to a bus connection. The processor 404 is an arithmetic processing unit implemented using a microprocessor or the like. The memory 406 is implemented by using a random access memory (RAM)

or the like. The storage device 408 is implemented by using a read only memory (ROM), a flash memory, or the like.

The input and output interface 410 is for connecting the line detection device 10 to peripheral devices. In the present diagram, the image pickup device 20 and the control device 30 are connected to the input and output interface 410.

The network interface 412 is for connecting the line detection device 10 to a communication network. This communication network is, for example, a controller area network (CAN). Meanwhile, the method by which the network interface 412 is connected to the communication network may be a wireless connection or a wired connection.

The storage device 408 stores a program module for implementing each functional element of the line detection device 10. The processor 404 implements each function of the line detection device 10 by reading the program module into the memory 406 and executing it.

Meanwhile, the hardware configuration of the above-mentioned integrated circuit is not limited to the configuration in the present diagram. For example, the program module may be stored in the memory 406. In this case, the integrated circuit need not include the storage device 408.

Figure 4:
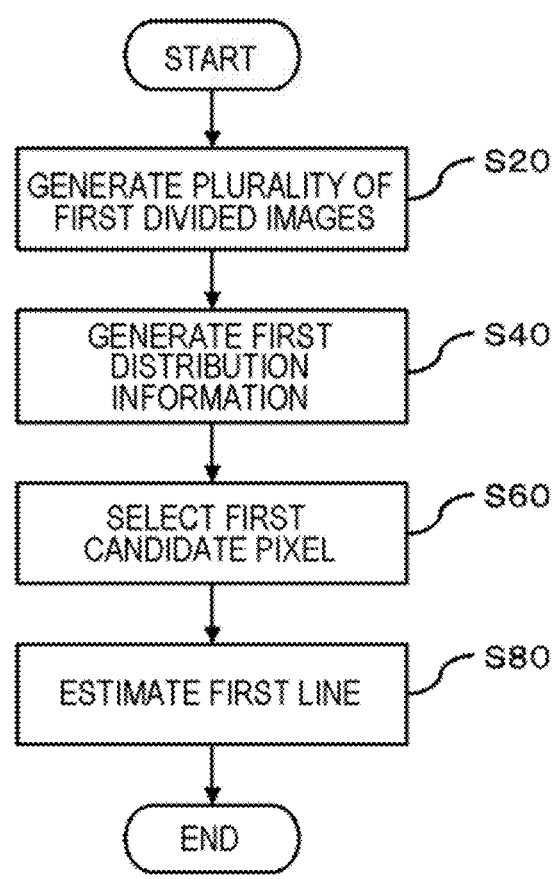
FIG. 4 is a flowchart showing processing performed by a line detection device.
Figure 5:
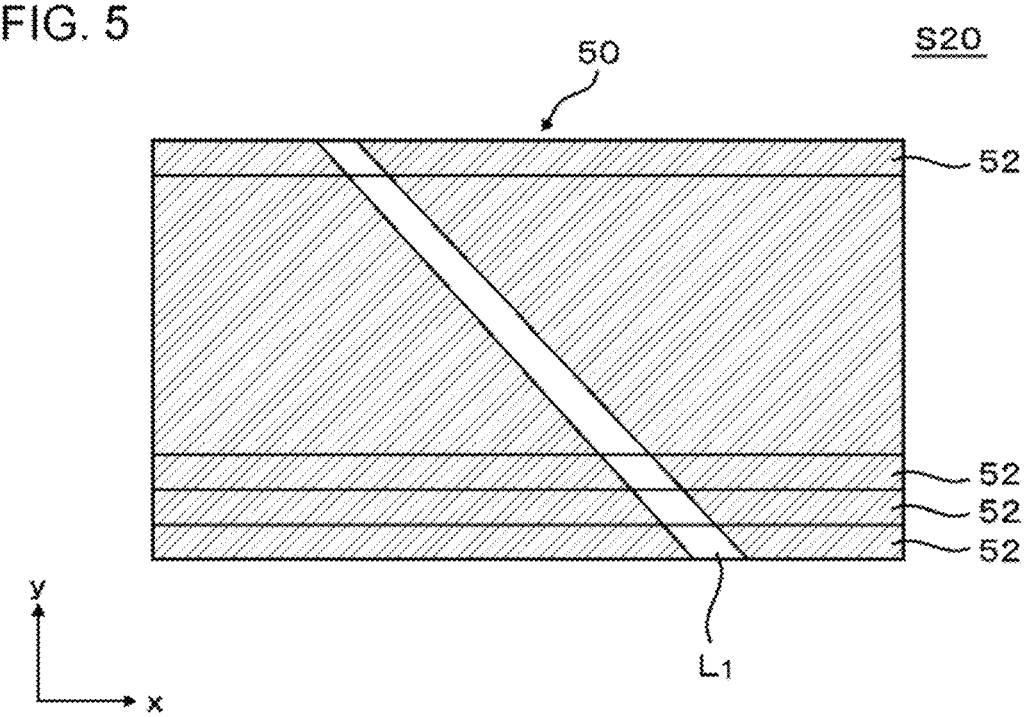
FIG. 5 is a diagram to explain S20 shown in FIG. 4.

FIG. 4 is a flowchart showing the processing performed by the line detection device 10. FIGS. 5-7 are diagrams to explain the processing shown in FIG. 4. First, when the image pickup device 20 generates frame images which constitute the moving image, the line detection device 10 acquires the frame image as a processed image 50. Then, the line detection device 10 performs the processing shown in FIG. 4 every time the line detection device 10 acquires a frame image.

First, as shown in FIG. 5, the dividing unit 120 of the line detection device 10 generates a plurality of divided images 52 (first divided images) by dividing the processed image 50 along a first direction (S20 of FIG. 4). The number of divided images 52 generated from one processed image 50 is, for example, equal to or greater than 10 and equal to or less than 30 but is not limited thereto. In a case where the image pickup device 20 captures the front of the mobile object 40, the y axis direction includes a component of the extending direction of the traveling path (for example, a road). Therefore, in the example shown in FIG. 5, the dividing unit 120 generates the divided images 52 by dividing the processed image 50 along the y axis direction. In this case, the load necessary for generating processing of the divided images 52 becomes small.

Figure 6A:
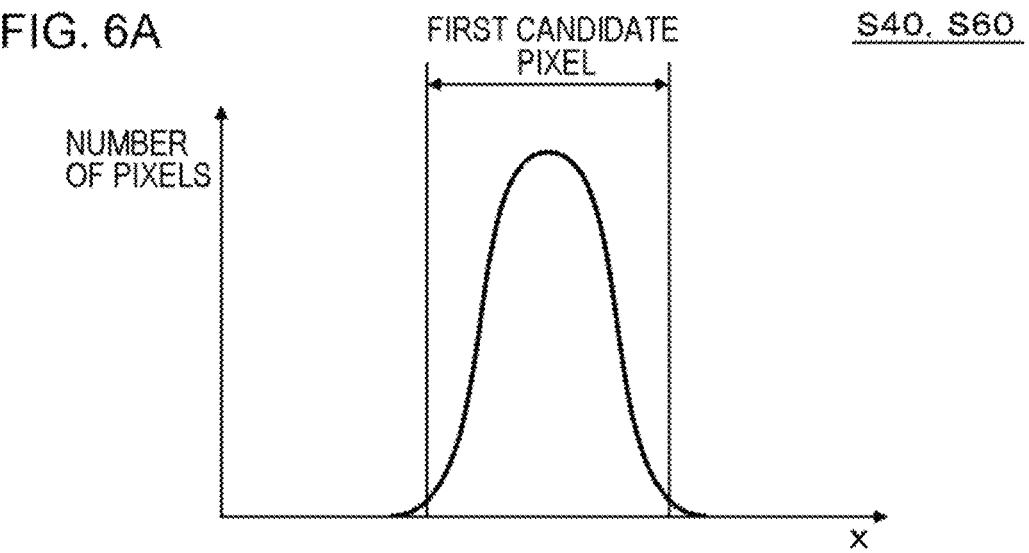
FIG. 6A and FIG. 6B are diagrams to explain S40 and S60 shown in FIG. 4.
Figure 6B:
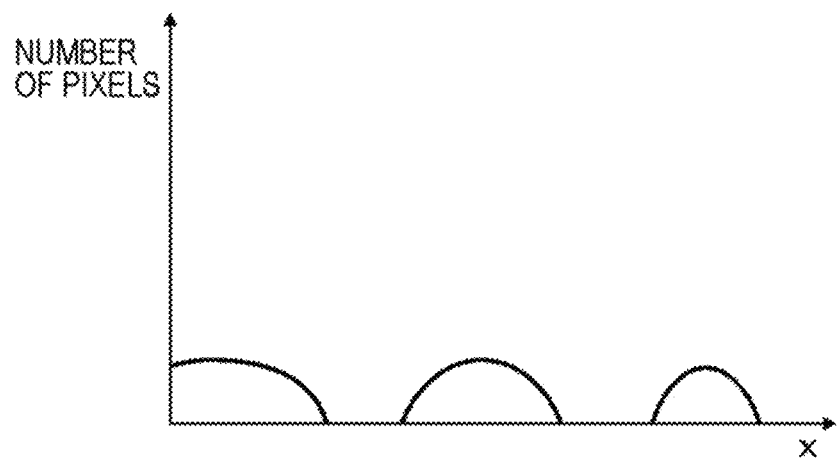

Thereafter, the distribution information generating unit 140 performs processing to generate first distribution information which shows the distribution of pixels satisfying the criterion with respect to each divided image 52 (S40 of FIG. 4). The criterion used here is, for example, having a color belonging to a predetermined range in a color space. For example, in a case where the line detection device 10 detects a yellow line, the above-mentioned "predetermined range" is a range which is recognized as yellow. For example, the distribution information generating unit 140 converts a pixel belonging to the predetermined range into 1 and converts other pixels into 0 (binarization processing). In addition, the first distribution information shows a distribution of pixels in a second direction intersecting the above-mentioned first direction. For example, as shown in FIG. 5, in a case where the first direction is the y axis direction, the second direction is, for example, the x axis direction. Further, as shown in FIG. 6A and FIG. 6B, the first distribution information is, for example, information showing a distribution of the number of pixels satisfying the criterion in the second direction.

Thereafter, the estimated information generating unit 160 performs processing to select the pixels estimated as a portion of the first line drawn on the traveling path (hereinafter referred to as first pixels) using the first distribution information generated by the distribution information generating unit 140 (S60 of FIG. 4). This processing is performed with respect to each divided image 52. For example, as shown in FIG. 6, in a case where the distribution information shows a distribution of the number of pixels satisfying the criterion in the second direction, the estimated information generating unit 160 selects a first image using at least one of a standard deviation and variance in the first distribution information. For example, when the standard deviation is equal to or less than a reference value, or when the variance is equal to or less than the reference value, the estimated information generating unit 160 selects all of the first candidate pixels as the first pixels. In this case, the estimated information generating unit 160 determines that the first line is included in the divided image 52. For example, as shown in FIG. 6A, all of the first candidate pixels are selected as the first pixels since the standard deviation or the variance is small. On the other hand, as shown in FIG. 6B, in a case where the standard deviation or the variance is great, no first pixel is selected from the first candidate pixels.

However, the estimated information generating unit 160 may select a portion of the first candidate pixels as the first pixels. In this case, as shown in FIG. 6A, the estimated information generating unit 160 selects, for example, pixels included in a region in which the number of pixels is equal to or greater than the reference value in the first distribution information as the first pixels.

Thereafter, the specifying processing unit 180 estimates the location of the first line included in the processed image 50 using the locations of the first pixels selected by the estimated information generating unit 160 in the processed image 50 (or locations in the divided image 52) (S80 of FIG. 4). For example, the specifying processing unit 180 estimates a mean value of the locations of the first pixels in the first direction as the location of the first line in the divided image 52. Then, the specifying processing unit 180 estimates the first line included in the processed image 50 by connecting the locations of the first line in a plurality of divided images 52 or by performing regression analysis. In addition, when estimating the location of the first line in the divided image 52, the most frequent value or a median may be used instead of the mean value of the locations of the first pixels in the first direction.

Figure 7A:
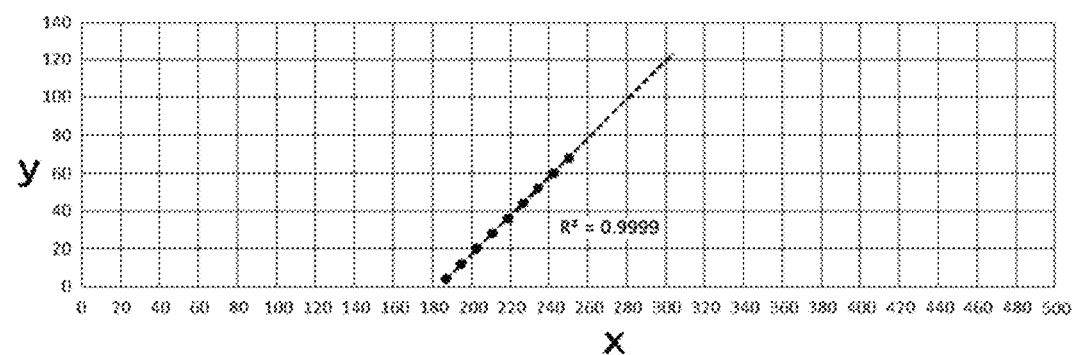
FIG. 7A and FIG. 7B are diagrams to explain S80 shown in FIG. 4.
Figure 7B:
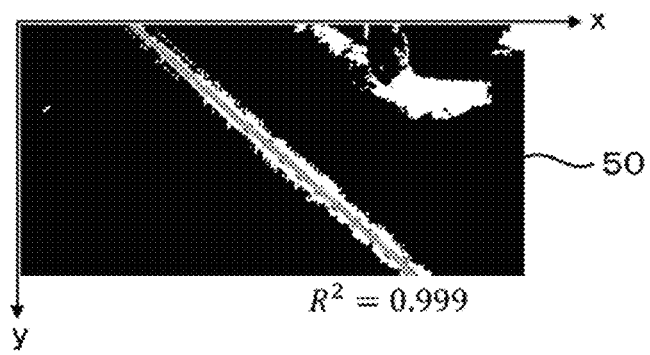

Each diagram of FIG. 7 is one example of S80 of FIG. 4, and a diagram to explain a case where the first line is estimated by the specifying processing unit 180 using regression analysis. In this example, a regression line is used. FIG. 7A is a diagram in which the estimated location of the first line is plotted. The specifying processing unit 180 generates a regression line in the diagram and estimates that the generated regression line shows the first line. FIG. 7B is an example of a case where the first line estimated in the processed image 50 is applied. In this case, for example, the estimated first line exists in a lower portion of the processed image 50 (a portion in which the plots of FIG. 7A exist) and extends to the upper end of the upper portion the processed image 50.

Meanwhile, as shown in FIG. 7B, the specifying processing unit 180 may specify a pixel overlapped with the regression line and a pixel continued with that pixel out of the first pixels as pixels constituting the first line. In other words, the specifying processing unit 180 may specify a lump overlapping the regression line out of lumps of the first pixels as pixels constituting the first line in each divided image 52.

Further, the distribution information generating unit 140 can select a pixel having a luminance satisfying a predetermined criterion and can generate distribution information of the selected pixel (hereinafter referred to as second distribution information). This criterion may be, for example, equal to or greater than a lower limit value, less than an upper limit value, or equal to or greater than the lower limit value and equal to or less than the upper limit value. In this case, when the estimated information generating unit 160 and the specifying processing unit 180 use the second distribution information instead of the first distribution information, the line detection device 10 can detect a white line.

As described above, according to the present embodiment, edge detection processing is not included in the processing performed by the dividing unit 120, the estimated information generating unit 160, and the specifying processing unit 180. Therefore, the necessary calculation amount for specifying the first line is reduced. A computing device having capabilities of calculating at high speed thus is unnecessary, and as a result, manufacturing costs of the line detection device 10 is reduced.

The distribution information generating unit 140 of the line detection device 10 generates first distribution information. The estimated information generating unit 160 selects first pixels (that is, pixels estimated to constitute the first line) using this first distribution information. Therefore, the calculation amount performed by the estimated information generating unit 160, that is, the calculation amount when selecting the pixels estimated to constitute the first line, is reduced.

Second Embodiment

A line detection device 10 according to the present embodiment is the same as the line detection device 10 shown in the first embodiment except the processing performed by the dividing unit 120.

Figure 8:
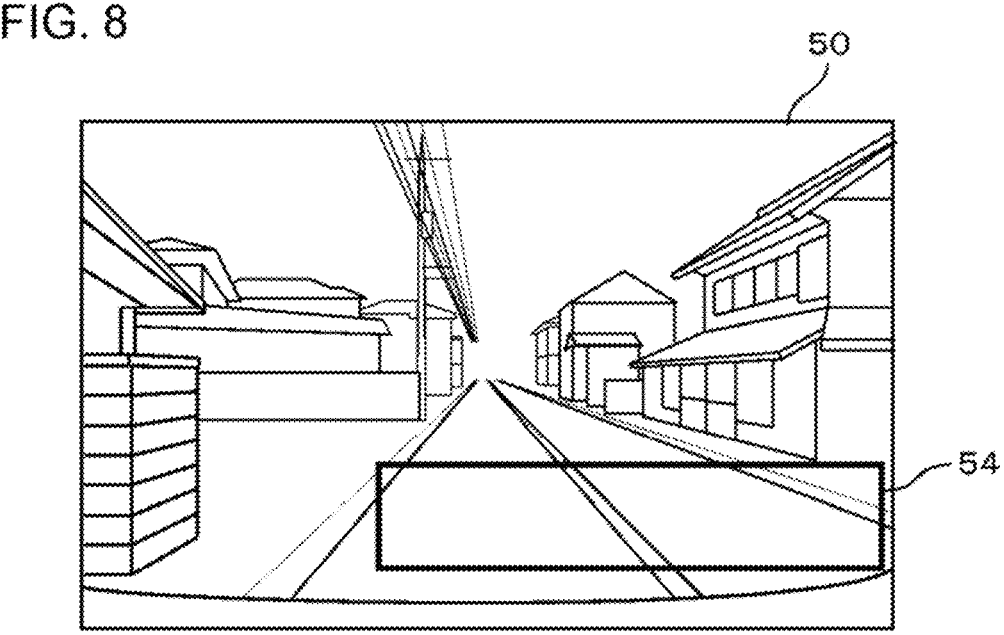
FIG. 8 is a diagram to explain processing performed by a dividing unit in a second embodiment.

FIG. 8 is a diagram to explain the processing performed by the dividing unit 120 in the present embodiment. In the present embodiment, the line detection device 10 generates divided images 52 only for a portion 54 of the processed image 50 and not generate divided images 52 for the entire processed image 50. For example, the line detection device 10 takes out the portion 54 of the processed image 50 and generates divided images 52 by dividing the portion 54. In the above manner, since the region to be processed by the distribution information generating unit 140, the estimated information generating unit 160, and the specifying processing unit 180 is limited to the portion 54 of the processed image 50, the calculation amount performed by the line detection device 10 is even more reduced.

Meanwhile, the location of the portion 54 in the processed image 50 is set in advance. For example, in a case where the image pickup device 20 is mounted in the mobile object 40, the road is highly possibly captured at the lower side of the processed image 50. Therefore, it is preferable to set the portion 54 on the lower part of the mobile object 40.

Third Embodiment

Figure 9:
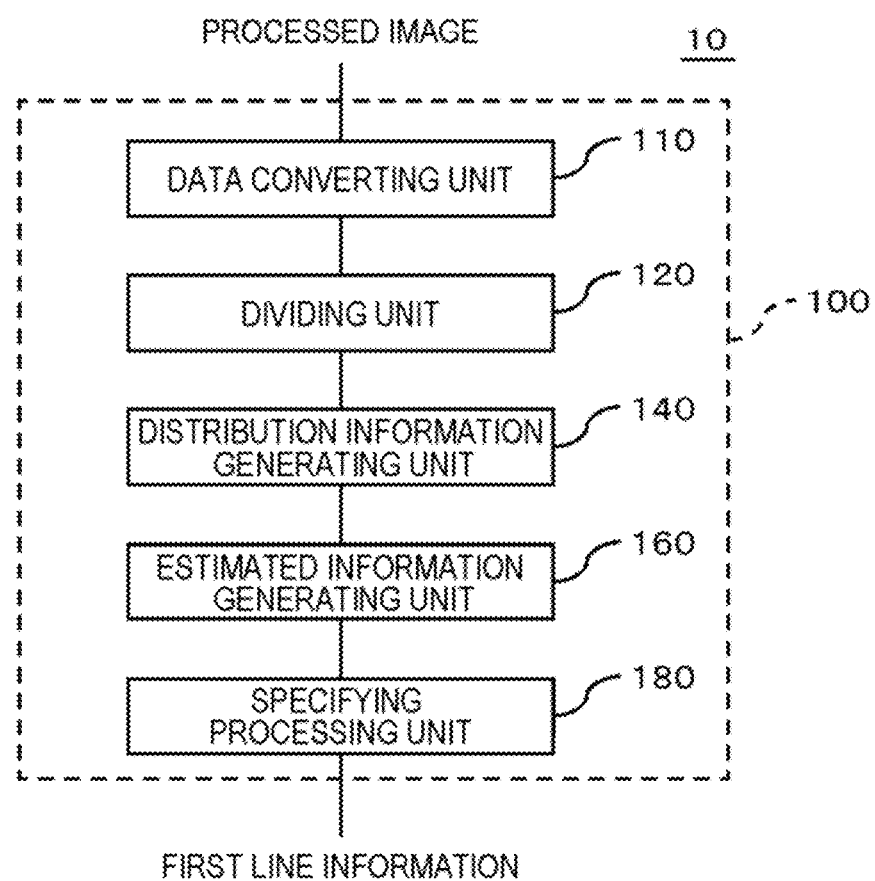
FIG. 9 is a diagram showing a functional configuration of a line detection device according to a third embodiment.

FIG. 9 is a diagram showing a functional configuration of a line detection device 10 according to a third embodiment. The line detection device 10 according to the present embodiment has the same configuration as that of the line detection device 10 according to the first or the second embodiment except that the line detection device 10 according to the present embodiment includes a data converting unit 110.

The processed image 50 generated by the image pickup device 20 is shown by an RGB color space. The data converting unit 110 converts the processed image 50 into an image shown by a color space defined by indexes of hue, lightness (luminance), and chroma, for example, an image shown by an HLS color space (converted image). Meanwhile, instead of the HLS color space, an HSV color space or a Lab color space may also be used. In addition, the dividing unit 120, the distribution information generating unit 140, the estimated information generating unit 160, and the specifying processing unit 180 perform processing using the converted processed image 50.

Depending on the color of the first line, it is sometimes easier for the distribution information generating unit 140 to process (easier to perform binarization processing of) the color space defined by the indexes of the hue, lightness (luminance), and chroma, for example, an image shown by an HLS color space, than to process the image shown by an RGB color space. In such a case, the line detection device 10 according to the present embodiment can detect the first line with high accuracy compared to a case where the processed image 50 shown by an RGB color space is directly processed. In a case where the first line is an yellow line, this tendency becomes conspicuous.

Figure 10:
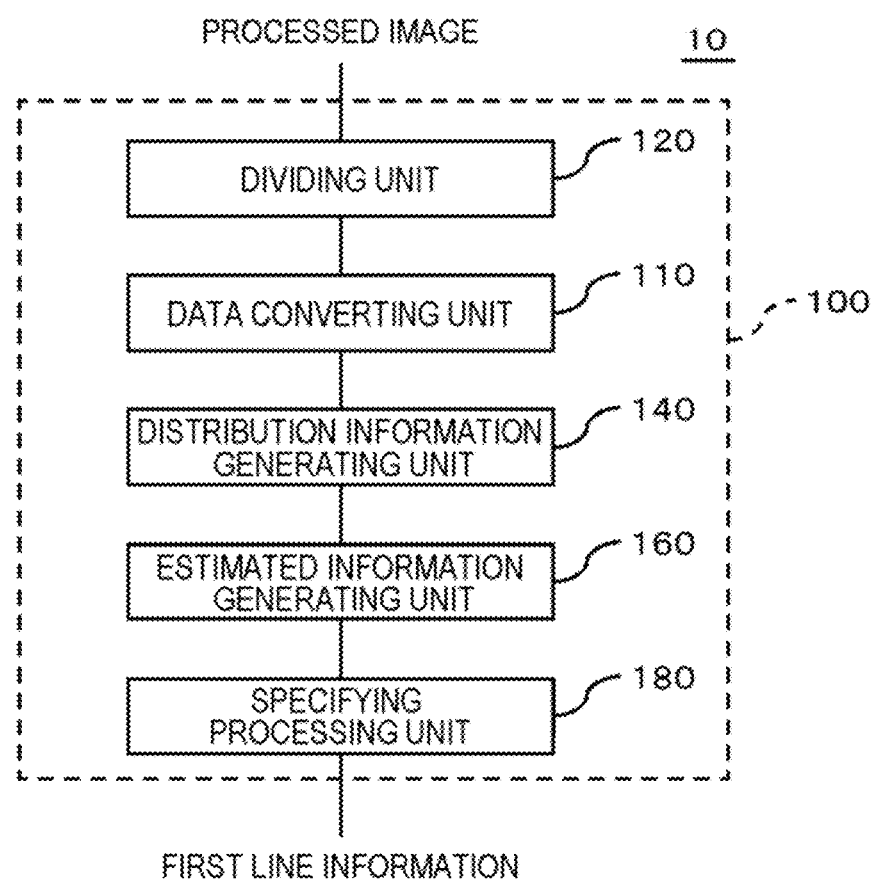
FIG. 10 is a diagram showing a modification example of FIG. 9.

Meanwhile, as shown in FIG. 10, the data converting unit 110 may perform the above-mentioned data conversion processing with respect to the divided image 52, and not to the processed image 50.

Fourth Embodiment

Figure 11:
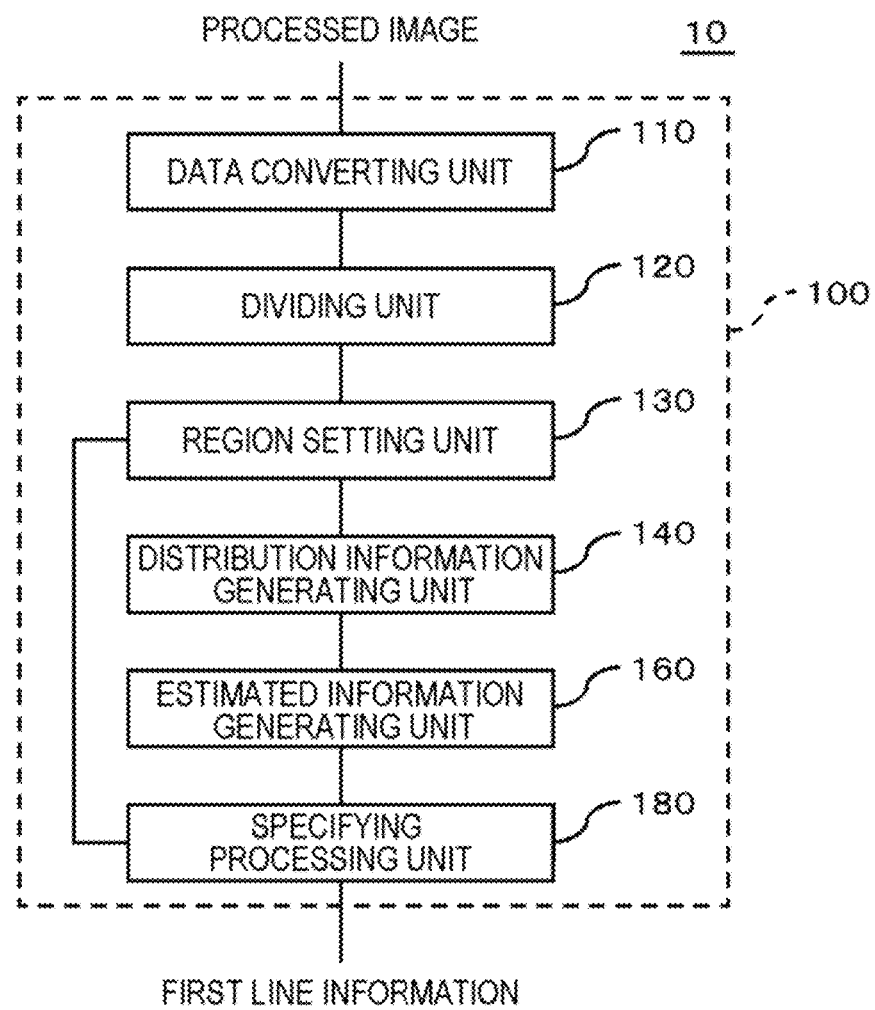
FIG. 11 is a diagram showing a configuration of a line detection device according to a fourth embodiment.

FIG. 11 is a diagram showing a configuration of a line detection device 10 according to a fourth embodiment. The line detection device 10 according to the present embodiment is the same as the line detection device 10 according to any of the first to third embodiments except that the line detection device 10 according to the present embodiment includes a region setting unit 130. FIG. 11 shows a case which is the same as the third embodiment.

In a case where the specifying processing unit 180 detects a first line in a first frame image, the region setting unit 130 reduces the region to be processed by the distribution information generating unit 140 in a frame image processed after (hereinafter referred to as a second frame image) the first frame image (for example, the next frame image). Specifically, the region setting unit 130 reduces the region to be processed by the distribution information generating unit 140 based on the location of the first line in the second direction (for example, the location of the x axis direction in FIG. 7) detected in the first frame image. For example, the region setting unit 130 sets the location of the first line in the second direction in the first frame image to be at the center of the region to be processed. Further, the region setting unit 130 narrows the width of the region to be processed. The region setting unit 130 performs the above-mentioned processing on, for example, the divided image 52.

Figure 12A:
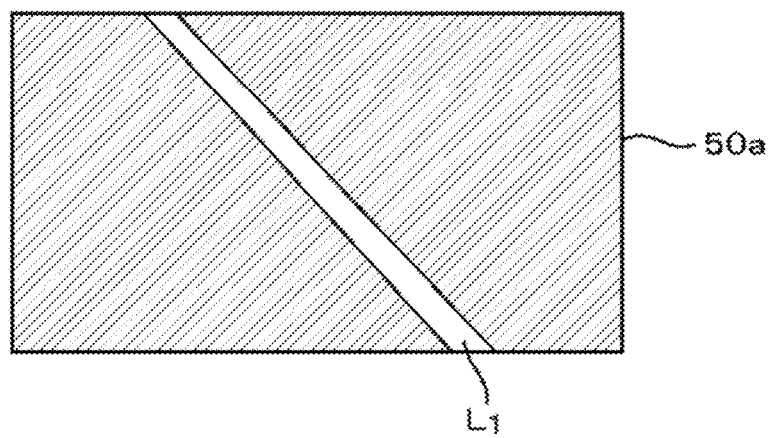
FIGS. 12A, 12B, and 12C are diagrams to schematically explain processing performed by a region setting unit.
Figure 12B:
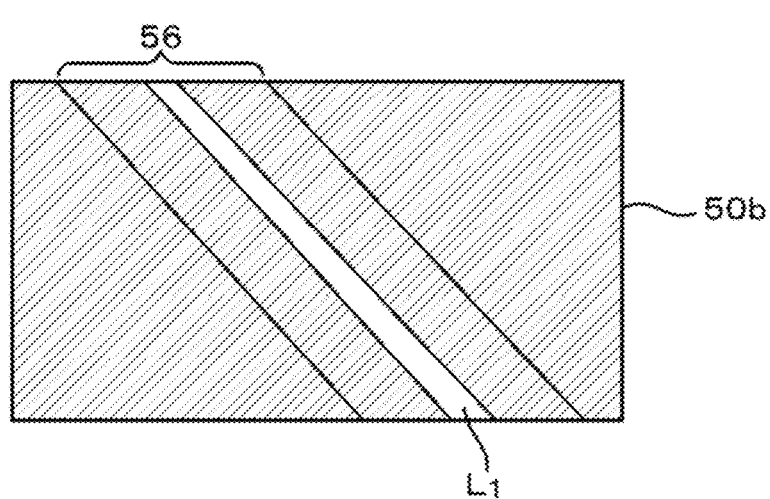
Figure 12C:
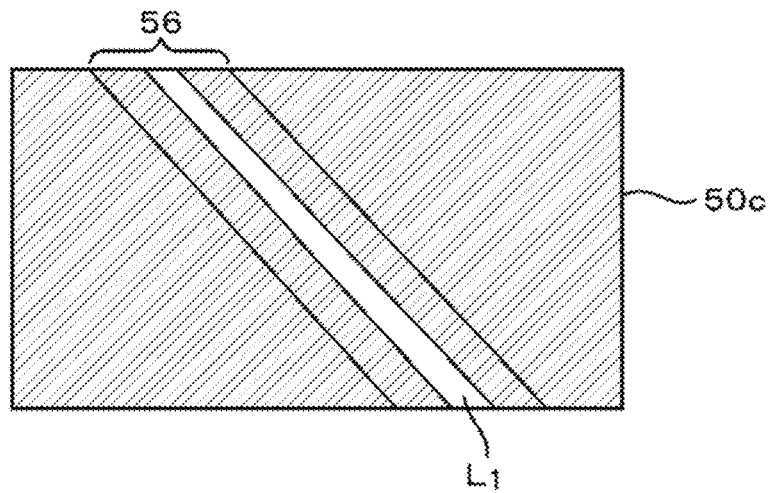

Each diagram of FIG. 12 is to schematically explain the processing performed by the region setting unit 130. As shown in FIG. 12A, in a case where the specifying processing unit 180 specifies a first line L1 in the first frame image (processed image 50a), the region setting unit 130 acquires information showing the location of the first line L1 (for example, information showing a line acquired by regression analysis) from the specifying processing unit 180. Then, the region setting unit 130 sets a region 56 to be processed by the distribution information generating unit 140 with respect to a second frame image (processed image 50b) as shown in FIG. 12B. Thereafter, in a case where the specifying processing unit 180 can also specify the first line L1 with respect to the second frame image (processed image 50b), the region setting unit 130 sets the region 56 in a third frame image (processed image 50c) located after the second frame image (processed image 50b) to be narrower than the region 56 in the second frame image (processed image 50b).

In this manner, when the first line L1 continues to be detected, the region 56 gradually becomes narrower. However, there is a lower limit in the size of the region 56 (for example, the width). That is, the region setting unit 130 prevents the size of the region 56 (for example, the width) from becoming lower than the lower limit. It is preferable that the lower limit used here is set greater than the above-mentioned width corresponding to the reference value of the standard deviation to serve as a criterion for determination of whether the divided image 52 includes a portion of the line or not.

Further, in a case where the first line was not specified in any frame image (processed image 50) after setting the region 56, the region setting unit 130 expands the region 56 or cancels the setting of the region 56 in the frame image thereafter (for example, the next frame image).

Meanwhile, the region setting unit 130 may perform the above-mentioned setting of the region 56 with respect to the processed image 50 before being processed by the dividing unit 120 (may be the processed image 50 after being converted by the data converting unit 110), or may perform the setting with respect to the first distribution information generated by the distribution information generating unit 140.

According to the present embodiment, the region setting unit 130 narrows the region 56 to be processed by the distribution information generating unit 140. At this time, the region setting unit 130 sets the region 56 based on the location of the first line L1 in the processed frame image. Therefore, it is possible to reduce the calculation amount of the line detection device 10 while maintaining detection accuracy of the line L1. Meanwhile, by narrowing the region 56 to be processed by the distribution information generating unit 140, it is also possible to inhibit the influence of noise which is unnecessary for detecting the line L1. For example, as the noise, characters drawn using yellow lines on a road which is separate from the line L1, or a display object or the like drawn using yellow lines may be mentioned as one example.

Fifth Embodiment

Figure 13:
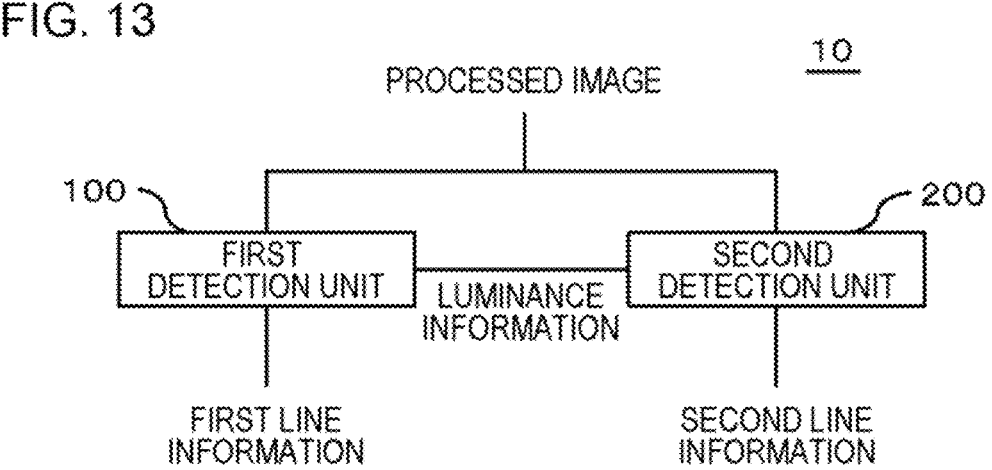
FIG. 13 is a diagram showing a functional configuration of a line detection device according to a fifth embodiment.

FIG. 13 is a diagram showing a functional configuration of a line detection device 10 according to a fifth embodiment. The line detection device 10 according to the present embodiment includes a second detection unit 200 other than the first detection unit 100. The first detection unit 100 is the same as any of the above-mentioned embodiments.

The second detection unit 200 detects a line drawn on a traveling path using luminance of pixels constituting the processed image 50. Specifically, the second detection unit 200 selects pixels having a luminance that satisfies the criterion from the processed image 50 and detects a line (second line) using the selected pixels. One example of this process is binarization.

At this time, when the criterion of luminance is not appropriately set, there is a possibility that the second detection unit 200 detects the first line detected by the first detection unit 100 together with another line. For example, in a case where the first detection unit 100 aims at detecting a yellow line and the second detection unit 200 aims at detecting a white line, the second detection unit 200 may detect a yellow line together with a white line. Hence, in the present embodiment, the second detection unit 200 sets the criterion of luminance using the luminance of the pixels constituting the first line detected by the first detection unit 100.

For example, in a case where the second detection unit 200 aims at detecting a white line, the above-mentioned criterion of luminance is a lower limit value. That is, the second detection unit 200 selects pixels having a luminance which is equal to or greater than a reference value. On the contrary, the second detection unit 200 may select pixels having a luminance which is equal to or less than the reference value. In this case, the second detection unit 200 can indirectly detect the aimed line by selecting pixels constituting a region other than the aimed line. Then, the second detection unit 200 sets the above-mentioned lower limit value based on a value acquired by statistically processing the luminance of the pixels constituting the first line detected by the first detection unit 100. Here, an example of a statistically processed value is, for example, a mean value, the most frequent value, or the like. In addition, the second detection unit 200 sets, for example, a value which is a sum of a statistically processed value and a constant as the lower limit value.

Further, the second detection unit 200 may exclude pixels constituting the first line specified by the first detection unit 100 from the processed image 50, and may detect a white line by selecting pixels having a luminance that is higher than a reference value from the excluded image. The lower limit value in this case is, for example, a fixed value, and a value higher than the luminance value of a common road surface is used.

Figure 14:
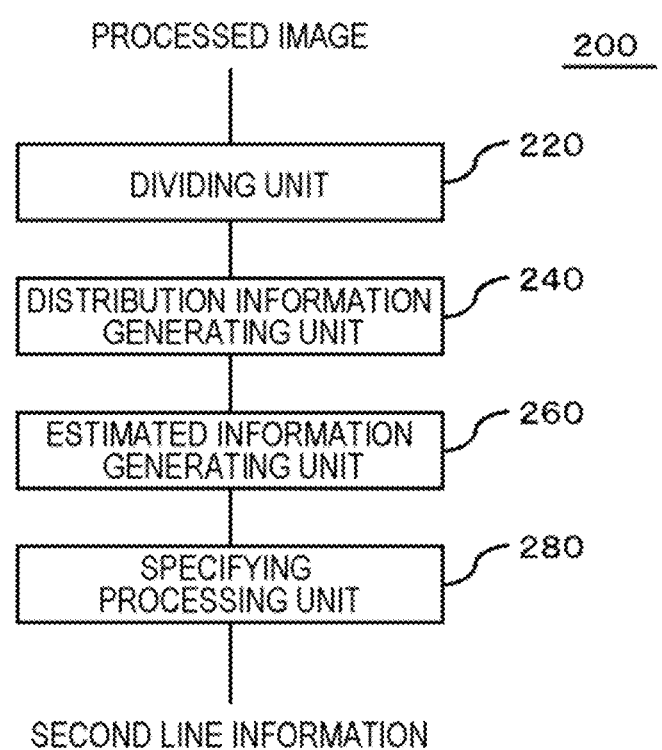
FIG. 14 is a diagram showing one example of a functional configuration of a second detection unit.

FIG. 14 is a diagram showing one example of a functional configuration of the second detection unit 200. In the example shown in the diagram, the second detection unit 200 includes a dividing unit 220, a distribution information generating unit 240, an estimated information generating unit 260, and a specifying processing unit 280 (one example of a second specifying processing unit, a third specifying processing unit, or a white line detection processing unit). The processing performed by the dividing unit 220 is the same as the processing performed by the dividing unit 120. In addition, the processing performed by the distribution information generating unit 240, the estimated information generating unit 260, and the specifying processing unit 280 is the same as the processing performed by the distribution information generating unit 140, the estimated information generating unit 160, and the specifying processing unit 280, respectively, except that the selection criterion of pixels is luminance. Therefore, in the present embodiment, the first detection unit 100 can also function as the second detection unit 200. In addition, the second detection unit 200 may include the data converting unit 110 before the dividing unit 220.

The distribution information generating unit 240 can select pixels having a luminance satisfying the predetermined criterion and generate distribution information of the selected pixels (second distribution information). The distribution information generating unit 240 sets the criterion used in this process, as described above, using the luminance of the pixels constituting the first line detected by the first detection unit 100.

Further, the distribution information generating unit 240 may exclude the pixels detected by the first detection unit 100 from the divided image 52 and may generate the second distribution information using the divided image 52 after exclusion of the pixels.

Figure 15:
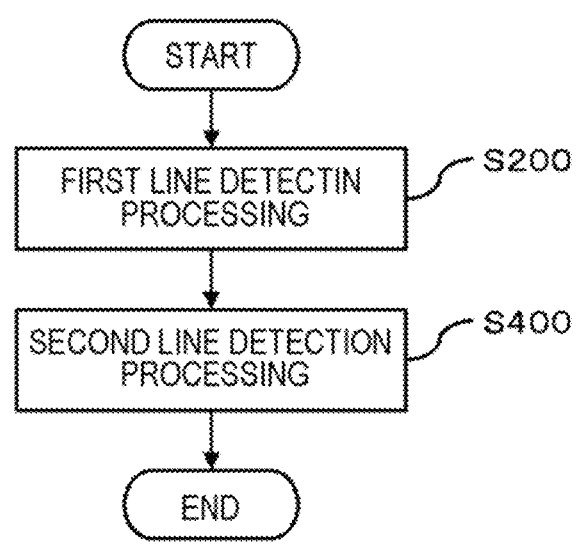
FIG. 15 is a flowchart showing one example of processing performed by a line detection device.

FIG. 15 is a flowchart showing one example of processing performed by the line detection device 10 according to the present embodiment. The line detection device 10 performs the processing shown in the present diagram with respect to each of the plurality of frame images. First, the first detection unit 100 performs detection processing of the first line (line of a first color). Thereafter, the second detection unit 200 performs detection processing of the second line (line of a second color) after receiving luminance information of the first line from the first detection unit 100. Here, the luminance of the first line is lower than the luminance of the second line.

In a case where the second detection unit 200 performs the processing before the first detection unit 100 performs the processing, that is, in a case where the second line is detected before the first line, there is a possibility that the second detection unit 200 detects the first line together with the second line due to a reason such that the criterion of luminance used in detecting the second line is too low. In contrast to this, in the present embodiment, the second detection unit 200 performs the processing after the first detection unit 100 performed the processing. Therefore, there is low possibility of the first line being detected together with the second line. For example, as described above, when the second detection unit 200 performs the processing, the second detection unit may detect only a white line by excluding the pixels constituting the first line (yellow line) detected by the first detection unit 100.

Meanwhile, details of the detection processing of the first line is as described in any of the above-mentioned embodiments. In addition, details of the detection processing of the second line is as described above.

Meanwhile, there may be a case where the first detection unit 100 fails to detect the first line. In this case, the distribution information generating unit 240 of the second detection unit 200 performs generating processing of the second distribution information using a predetermined criterion of luminance.

Further, the second detection unit 200 may perform the detecting process of the second line with respect to the entire processed image 50, or may perform the detecting processing of the second line with respect to only a portion of the processed image 50. In the latter case, the second detection unit 200 may determine a region in which the detecting processing of the second line is carried out with the first line as reference. In the above manner, the amount of calculation processing performed by the second detection unit 200 is reduced.

Figure 16:
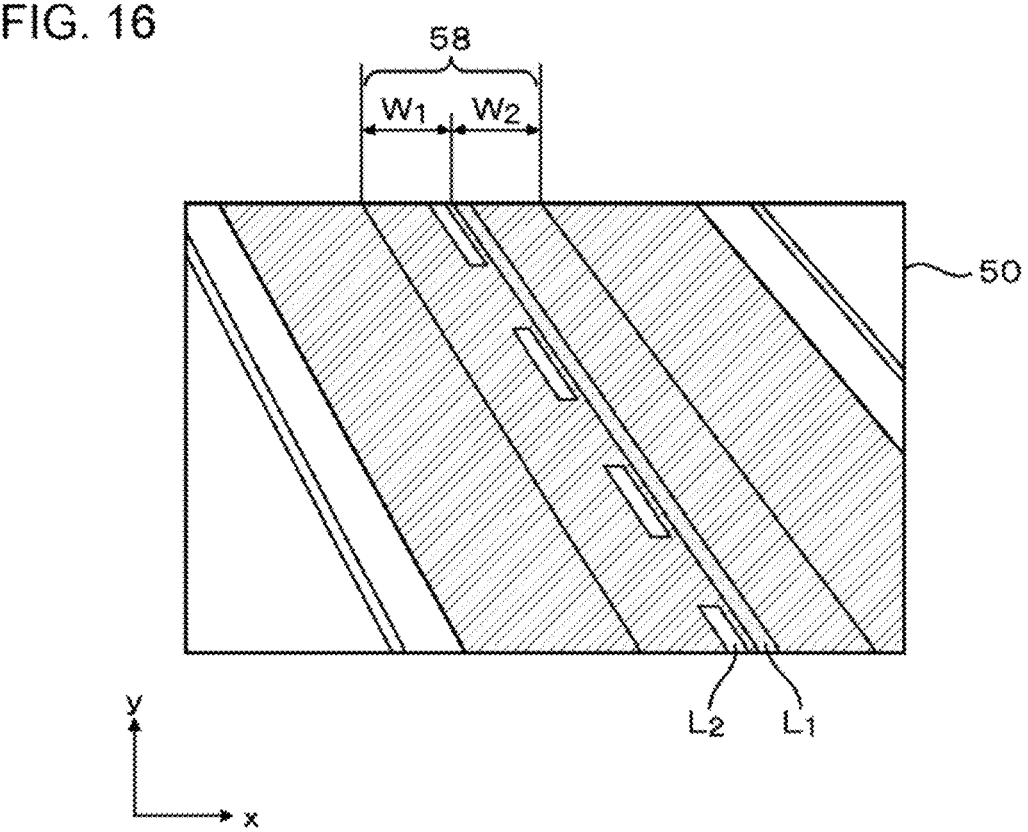
FIG. 16 is a diagram to explain one example of a region to be processed by a second detection unit.

FIG. 16 is a diagram to explain one example of a region to be processed by the second detection unit 200. As shown in the present diagram, a second line L2 (for example, a white line) may be drawn in parallel to a first line L1 (for example, a yellow line) on a traveling path (for example, a road). In such a case, the second detection unit 200 determines a range to be processed in a direction intersecting the line L1 based on the line L1, and detects the second line L2 located in the range. For example, in the lateral direction of the processed image 50 (x axis direction), the second detection unit 200 sets a first width W1 in a positive direction from the first line L1 as the center and sets a second width W2 in the negative direction from the center. Then, the range is set as a region 58. Meanwhile, the first width W1 and the second width W2 may be equal to each other or different from each other. In addition, the width of the region 58 may be changed along the extending direction of the line L1. For example, in a case where the width of the region included in the processed image 50 becomes narrower toward the upper side of the processed image 50, the width of the region 58 may become narrower toward the upper side of the processed image 50.

As described above, according to the present embodiment, it is possible to detect the first line with accuracy and it is also possible to detect the second line with accuracy.

Sixth Embodiment

Figure 17:
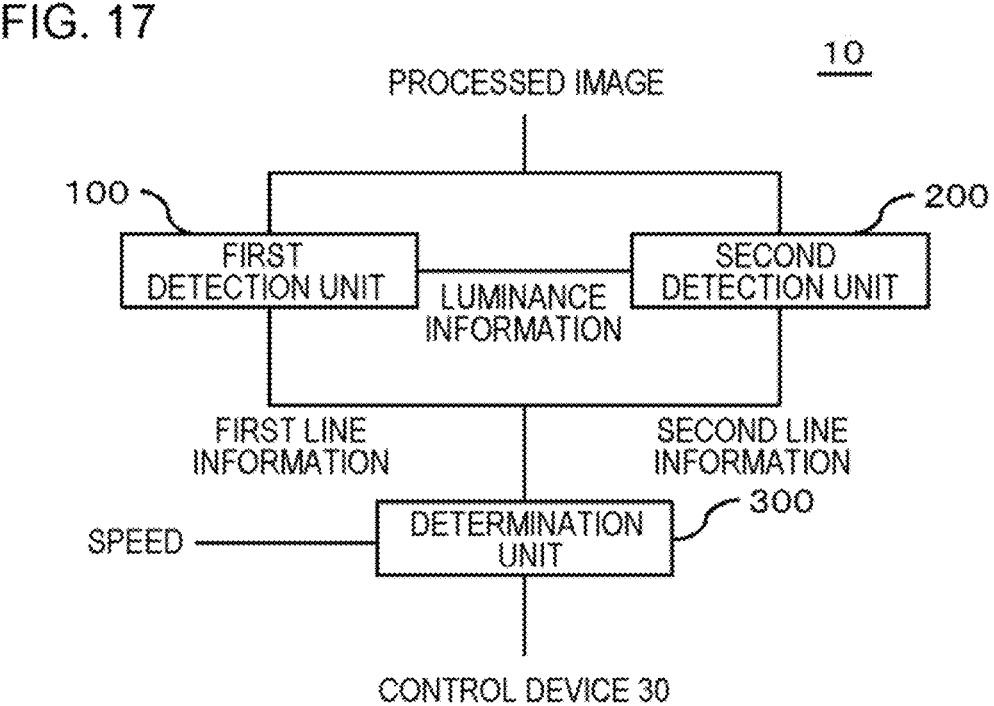
FIG. 17 is a diagram showing a functional configuration of a line detection device according to a sixth embodiment.

FIG. 17 is a diagram showing a functional configuration of a line detection device 10 according to a sixth embodiment. The line detection device 10 according to the present embodiment has the same configuration as that of the line detection device 10 according to the fifth embodiment except that the line detection device 10 according to the present embodiment includes a determination unit 300.

As described above, the first detection unit 100 detects a first line included in the processed image 50 and the second detection unit 200 detects a second line included in the processed image 50. The processed image 50 is each of frame images constituting a moving image. The determination unit 300 calculates the detection cycle of the first line using the processing results of the first detection unit 100 for each of the frame images and determines whether the first line is a dotted line or not. The determination unit 300 performs the same processing for the second line.

A case where the determination unit 300 processes a first line will be described below. Every time the first detection unit 100 processes a frame image (processed image 50), the determination unit 300 specifies a first line included in the frame image. Then, the determination unit 300 determines the detection cycle of the first line by processing the transition between the frame images in the specified results.

For example, as described above, a case where the estimated information generating unit 160 of the first detection unit 100 performs processing to determine whether a first line is included or not in the divided images 52 with respect to each divided image 52 is considered. In this case, the determination unit 300 calculates the number of the divided images 52 determined to include the first line. Then, as shown in each diagram in FIG. 18, the determination unit 300 determines whether the first line is a dotted line or not by using the transition of the number of the divided images 52. Specifically, the determination unit 300 determines that the first line is a dotted line when an increase or a decrease in the number of the divided images 52 is repeated in a fixed period. Meanwhile, the determination unit 300 determines that the first line is a solid line in a case where a state in which the calculated number of the divided images 52 is equal to or greater than a reference number (for example, equal to or greater than 70% of the number of the divided images 52 included in one frame image) continues in frame images of a fixed number or greater. Further, in a case where the increase or decrease in the number of the divided images 52 is irregularly repeated, the determination unit 300 determines that the first line is a solid line but is partly missing (or is blurred).

Meanwhile, FIG. 18A shows results of plotting the above-mentioned number of divided images 52 for each frame image and FIG. 18B shows results of plotting the transition of values acquired by averaging the number of the above divided images 52 over continuous plural number of (for example, 5) frame images. In any case, since the increase or decrease of the number of the divided images 52 is repeated in a fixed cycle, the increase or decrease of the number of the divided images 52 can be an object of processing by the determination unit 300. Meanwhile, FIG. 18B shows that the above-mentioned mean values of the divided images 52 are within a fixed range.

Meanwhile, the line detection device 10 may acquire information to specify the speed of the mobile object 40 when the image pickup device 20 generates the processed image 50. For example, the line detection device 10 acquires information showing the time when the processed image 50 was generated with respect to each processed image 50 and acquires information showing the speed of the mobile object 40 according to time. In this case, the determination unit 300 can determine whether the first line is a dotted line or not by further using this speed.

Specifically, the determination unit 300 calculates the length of the first line using the above-mentioned detection cycle of the first line and the speed of the mobile object 40. For example, as shown in FIG. 8, a case where the portion 54 is set in the processed image 50 is considered. The determination unit 300 counts the pieces of the frame images from the frame image in which the number of the divided images 52 determined to include the first line is equal to or greater than a reference number to the frame image in which the number of the divided images 52 is equal to or less than the reference number, and calculates the length of the first line by multiplying the number of pieces of the frame images by the frame rate and the speed of the mobile object 40. In addition, the determination unit 300 counts the pieces of the frame images from the frame image in which the number of the divided images 52 determined to include the first line is equal to or less than a reference number to the frame image in which the number of the divided images 52 is equal to or greater than the reference number, and calculates the interval between first lines by multiplying the number of pieces of the frame images by the frame rate and the speed of the mobile object 40. Then, the determination unit 300 determines that the first line is a dotted line when variation in the calculated lengths of the first lines and variation in the interval between the first lines are equal to or less than a fixed value. Meanwhile, when the variation in the calculated lengths of the first lines is equal to or greater than a fixed value, the determination unit 300 determines that the first line is a solid line but is partly missing (or is blurred).

In a case where the determination unit 300 calculates at least one of the length of the first line and the interval between the first lines, whether the first line is a dotted line or not may be determined by using a degree of match between this length and a reference length. In this case, as shown in FIG. 17, the determination unit 300 may acquire type information to specify the type of the traveling path and may determine the above-mentioned reference length by using the type information. The type information, for example, specifies which of a general road, a toll road, and an expressway is the type of the traveling path. In a case of the expressway, the reference length is long compared to a case of the general road. Meanwhile, the above-mentioned type information may directly specify the above-mentioned roads, or may be information showing the location of the mobile object 40 (for example, information showing latitude and longitude such as GPS information).

Determination results by the determination unit 300 are outputted to the control device 30 of the mobile object 40. The control device 30 controls the traveling of the mobile object 40 (for example, the possibility of a lane change) using information showing the determination results, that is, whether the first line (or the second line) is a solid line or a dotted line. A specific example of the determination is determined based on, for example, traffic rules.

As described above, according to the present embodiment, the determination unit 300 can accurately determine whether the first line and the second line are dotted lines or not. Further, the control device 30 of the mobile object 40 allows advanced autonomous driving of the mobile object 40, since the control device 30 controls the traveling of the mobile object 40 using the determination results.

Meanwhile, the above-mentioned determination unit 300 may also be included in the line detection device 10 according to the first to fourth embodiments.

As described above, although the embodiments and examples of the present invention have been set forth with reference to the accompanying drawings, they are merely illustrative of the present invention, and various configurations other than those stated above can be adopted.

The invention claimed is:

1. A line detection device comprising:
   a first processing unit that extracts a pixel located in a range comprising a predetermined color from an image comprising a traveling path on which a mobile object travels to detect a line of a first color comprised in the image using a distribution of the extracted pixel in the image; and
   a second processing unit that extracts, after execution of processing by the first processing unit, a pixel located in a luminance range comprising a predetermined luminance from the image and specifies a line of a second color which is comprised in the image and is different from the first color using a distribution of the extracted pixel located in the luminance range comprising the predetermined luminance in the image,
   wherein the second processing unit excludes pixels comprising the line of the first color detected by a first detection unit from the image, and performs the specifying the line of the second color on the image after the exclusion.

2. The line detection device according to claim 1, wherein the second processing unit determines the luminance range by using luminance of the detected line of the first color.

3. The line detection device according to claim 1, wherein the first color is yellow, and the second color is white.

4. The line detection device according to claim 1, wherein the second processing unit specifies the line of the second color when the first processing unit fails to detect the line of the first color.

5. The line detection device according to claim 1, wherein the image is captured by an image pickup device mounted in the mobile object.

6. The line detection device according to claim 5, wherein the image is acquired by capturing a front of the mobile object.

7. A line detection method executed by a computer, the method comprising:
   processing an image comprising a traveling path on which a mobile object travels to detect a line of a first color comprised in the image; and
   extracting, after execution of detection processing of the line of the first color, a pixel located in a luminance range comprising a predetermined luminance from the image, and specifying a line of a second color which is comprised in the image and is different from the first color using a distribution of the extracted pixel in the image, wherein, in the extracting, pixels comprising the line of the first color detected by a first detection unit from the image is excluded, and the specifying the line of the second color is performed on the image after the exclusion.

8. A non-transitory storage medium storing a program executable by a computer, the program causing the computer to execute processing comprising:

processing an image comprising a traveling path on which a mobile object travels to detect a line of a first color comprised in the image; and extracting, after execution of detection processing of the lint of the first color, a pixel located in a luminance range comprising a predetermined luminance from the image and specifying a line of a second color which is comprised in the image and is different from the first color using a distribution of the extracted pixel in the image, wherein, in the extracting, pixels comprising the line of the first color detected by a first detection unit from the image is excluded, and the specifying the line of the second color is performed on the image after the exclusion.

* * * * *